US011167760B2

(12) United States Patent
Okamoto et al.

(10) Patent No.: US 11,167,760 B2
(45) Date of Patent: Nov. 9, 2021

(54) VEHICLE ALARMING SYSTEM

(71) Applicants:DENSO CORPORATION, Kariya (JP); SUBARU CORPORATION, Tokyo (JP)

(72) Inventors: Youhei Okamoto, Tokyo (JP); Shigeyuki Kato, Tokyo (JP); Hiroshi Morimoto, Kariya (JP); Ayako Tsunoda, Kariya (JP); Kaneyoshi Ueda, Kariya (JP)

(73) Assignees: DENSO CORPORATION, Kariya (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/820,628

(22) Filed: Mar. 16, 2020

(65) Prior Publication Data

US 2020/0216070 A1 Jul. 9, 2020

Related U.S. Application Data

(63) Continuation of application No. PCT/JP2018/027922, filed on Jul. 25, 2018.

(30) Foreign Application Priority Data

Sep. 22, 2017 (JP) .............................. JP2017-182703

(51) Int. Cl.
*B60W 30/16* (2020.01)
*B60W 50/14* (2020.01)
*G08G 1/16* (2006.01)

(52) U.S. Cl.
CPC ............ *B60W 30/16* (2013.01); *B60W 50/14* (2013.01); *G08G 1/166* (2013.01); *B60W 2050/143* (2013.01); *B60W 2554/802* (2020.02)

(58) Field of Classification Search
None
See application file for complete search history.

(56) References Cited

U.S. PATENT DOCUMENTS 4,309,758 A * 1/1982 Halsall ................. G05D 1/0234
180/169
4,328,545 A * 5/1982 Halsall ...................... G01S 5/16
180/167

(Continued)

FOREIGN PATENT DOCUMENTS

JP 2002-362391 A 12/2002
JP 2004322772 A 11/2004

(Continued)

*Primary Examiner* — Curtis J King
(74) *Attorney, Agent, or Firm* — Harness, Dickey & Pierce, P.L.C.

(57) ABSTRACT

A vehicle alarming system is provided to include (i) an inter-vehicle distance detector and (ii) an alarm. The inter-vehicle distance detector is configured to detect an inter-vehicle distance between a host vehicle and a vehicle ahead of the host vehicle. The alarm is configured to issue an alarm signal to a manipulation applied to an in-vehicle device in response to that a driving load including the inter-vehicle distance detected by the inter-vehicle distance detector satisfies an alarming condition of enabling the alarm. An execution state of a cruise control function is excluded from the alarming condition of enabling the alarm. The alarm is enabled in response to determining an override state in which acceleration or deceleration is manipulated forcedly by a driver of the host vehicle under the execution of the cruise control function.

20 Claims, 7 Drawing Sheets

(56) References Cited

U.S. PATENT DOCUMENTS

| | | | |
|---|---|---|---|
| 6,345,225 B1* | 2/2002 | Bohm | B60T 8/321 |
| | | | 180/197 |
| 8,024,102 B2* | 9/2011 | Swoboda | B60T 7/22 |
| | | | 701/96 |
| 10,657,597 B1* | 5/2020 | Billman | G06Q 40/08 |
| 2004/0020698 A1* | 2/2004 | Gehrke | B60K 31/042 |
| | | | 180/170 |
| 2004/0215385 A1* | 10/2004 | Aizawa | B60T 7/12 |
| | | | 701/93 |
| 2006/0235615 A1 | 10/2006 | Kato et al. | |
| 2008/0183360 A1* | 7/2008 | Zhang | B60W 50/14 |
| | | | 701/70 |
| 2015/0002286 A1 | 1/2015 | Kasai et al. | |
| 2017/0329338 A1* | 11/2017 | Wei | G05D 1/0212 |
| 2018/0004213 A1* | 1/2018 | Absmeier | G05D 1/0214 |
| 2018/0050698 A1* | 2/2018 | Polisson | B60W 60/00 |
| 2018/0099678 A1* | 4/2018 | Absmeier | B60R 16/037 |
| 2019/0315345 A1* | 10/2019 | Newman | B60W 50/14 |
| 2019/0366811 A1* | 12/2019 | O'Keeffe | B60W 40/02 |
| 2020/0101968 A1* | 4/2020 | Kim | B60W 30/16 |
| 2020/0125093 A1* | 4/2020 | Sham | G06K 9/3241 |
| 2020/0387156 A1* | 12/2020 | Xu | B60W 10/20 |

FOREIGN PATENT DOCUMENTS

| | | |
|---|---|---|
| JP | 2006-318446 A | 11/2006 |
| JP | 2007246089 A | 9/2007 |
| JP | 2015-7933 A | 1/2015 |

\* cited by examiner

VEHICLE ALARMING SYSTEM

CROSS REFERENCE TO RELATED APPLICATIONS

The present application is a continuation application of International Patent Application No. PCT/JP2018/027922 filed on Jul. 25, 2018, which designated the U.S. and claims the benefit of priority from Patent Application No. 2017-182703 filed on Sep. 22, 2017. The entire disclosures of all of the above applications are incorporated herein by reference.

TECHNICAL FIELD

The present disclosure relates to a vehicle alarming system that is mounted on a host vehicle and issues an alarm against a manipulation applied to an in-vehicle device in accordance with a driving load including an inter-vehicle distance to a vehicle ahead of the host vehicle.

BACKGROUND

In recent years, in vehicles such as automobiles, the types of in-vehicle devices such as navigation devices, air conditioners, audio devices, and various steering switches have been increased and the functions of the in-vehicle devices have been diversified. In contrast, in order to ensure the safety of driving by the driver, while the host vehicle is running, there are restrictions on the functions of display and/or manipulation on the in-vehicle devices; also, an alarming system is provided to issue an alarm when a driver intends to manipulate the in-vehicle device. In such an alarming system, when the inter-vehicle distance to a vehicle ahead of the host vehicle acquired with the camera or radar falls below a threshold value, it is determined that the safety level is low. Thereby, an alarm is issued when the driver intends to manipulate the in-vehicle device.

SUMMARY

According to an example of the present disclosure, a vehicle alarming system is provided to include (i) an inter-vehicle distance detector and (ii) an alarm. The inter-vehicle distance detector is configured to detect an inter-vehicle distance between a host vehicle and a vehicle ahead of the host vehicle. The alarm is configured to issue an alarm signal to a manipulation applied to an in-vehicle device in response to that a driving load including the inter-vehicle distance detected by the inter-vehicle distance detector satisfies an alarming condition of enabling the alarm. An execution state of a cruise control function is excluded from the alarming condition of enabling the alarm. The alarm is enabled in response to determining an override state in which acceleration or deceleration is manipulated forcedly by a driver of the host vehicle under the execution of the cruise control function.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, several embodiments embodying the present disclosure will be described with reference to the drawings. In addition, the substantially common part between several embodiments described below use signs in common; thereby new illustration and repeated description may be abbreviated.

(1) First Embodiment

Figure 1:
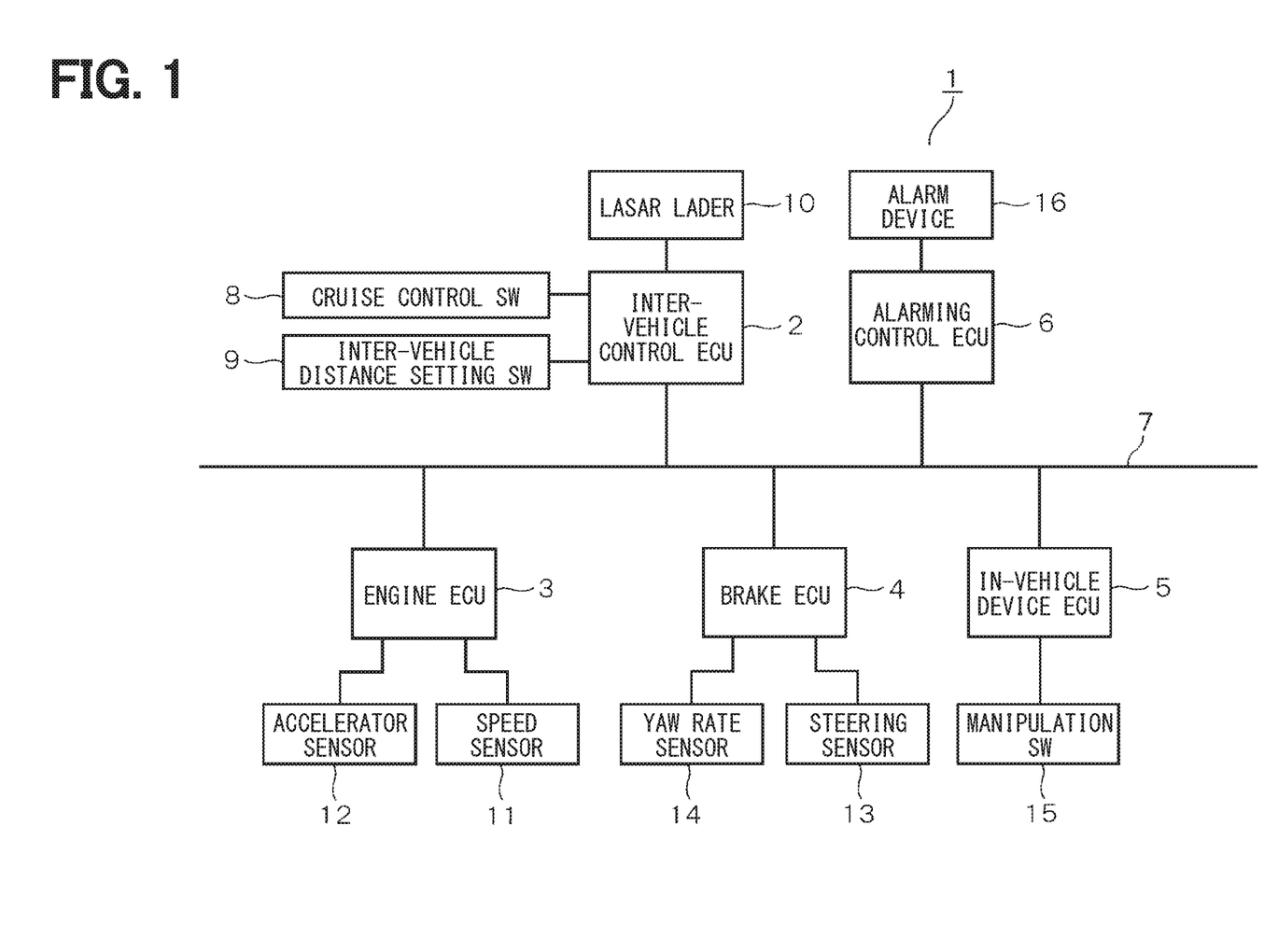
FIG. 1 is a diagram schematically showing an overall configuration of a system according to a first embodiment.
Figure 2:
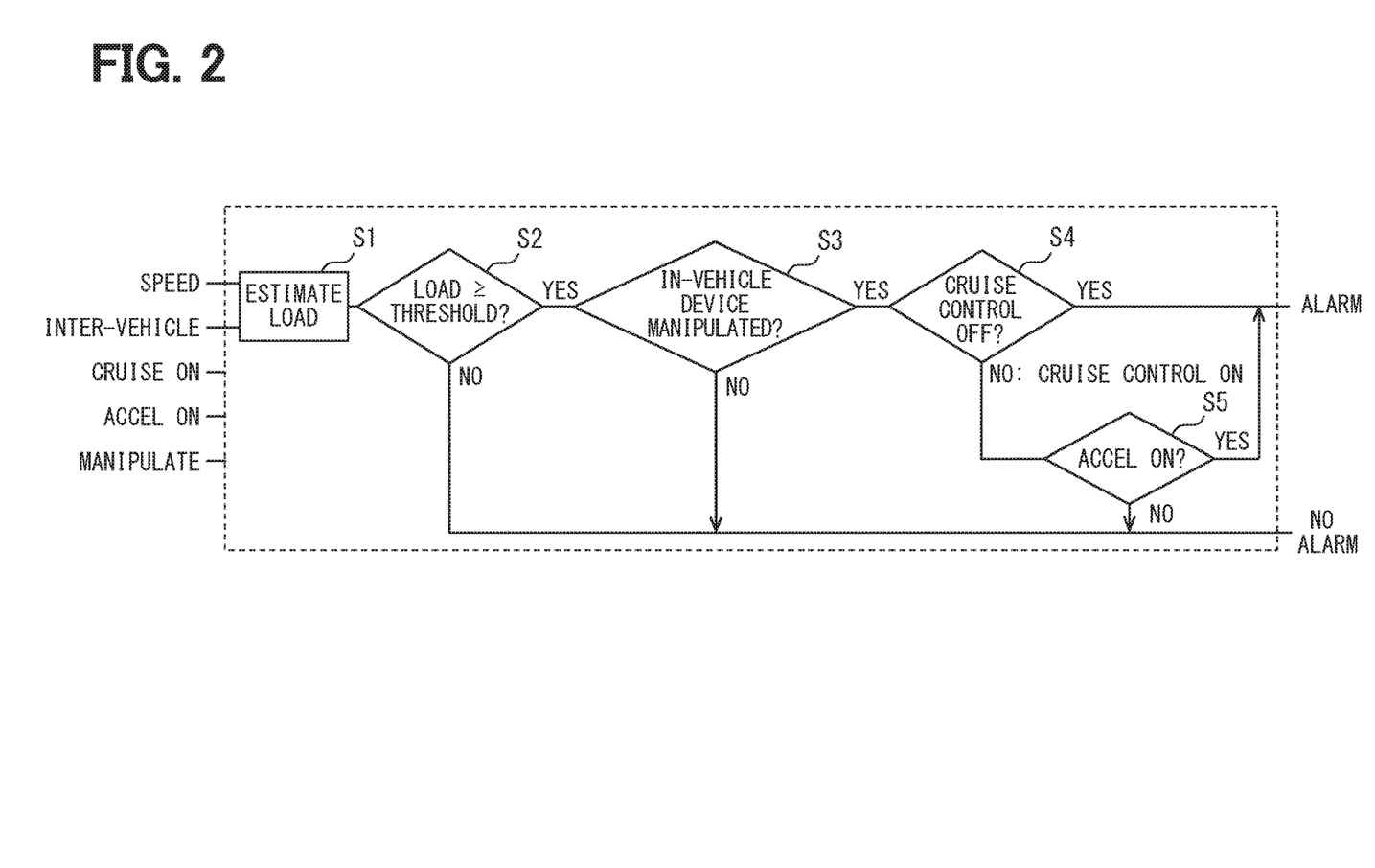
FIG. 2 is a flowchart schematically showing a procedure of a process related to alarming executed by an alarming control ECU during traveling of a vehicle.

First, a first embodiment will be described with reference to FIGS. 1 to 3. FIG. 1 schematically shows a configuration of a vehicle control system 1 mounted on a vehicle (i.e., host vehicle) including an automobile, for example. Here, the vehicle control system 1 includes (i) a vehicle alarming system and (ii) a cruise control system that realizes a cruise control function.

The vehicle control system 1 includes a plurality of electronic control units (abbreviated as "ECUs") such as an inter-vehicle control ECU 2, an engine ECU 3, a brake ECU 4, an in-vehicle device ECU 5, and an alarming control ECU 6. Each ECU may be also referred to as an electronic controller or an electronic control circuit. As an example of the present embodiment, each of the ECUs mainly includes a microcomputer having a central processing unit, and storages such as ROM, RAM, or the like, and is connected to each other by an in-vehicle network 7 such as CAN. In the present embodiment, as is well known, a plurality of devices such as a navigation device, an air conditioner device, and an audio device are mounted on the host vehicle as in-vehicle devices.

A plurality of ECUs are provided for controlling the respective in-vehicle devices (i.e., the respective apparatuses). Herein, for convenience, one in-vehicle device ECU 5 will be representatively described. A manipulation signal from a manipulation switch 15 for manipulating an in-vehicle device is input to the in-vehicle device ECU 5.

A cruise control switch 8 and an inter-vehicle distance setting switch 9, which are connected to the inter-vehicle control ECU 2, input their manipulation signals to the inter-vehicle control ECU 2. The cruise control switch 8 is a switch for the user to turn on/off the cruise control function. The inter-vehicle distance setting switch 9 is a switch for the user to set a target inter-vehicle distance to a vehicle ahead of the host vehicle. In this case, the target inter-vehicle distance can be set in three stages, for example, short, middle, and long.

Further, the inter-vehicle control ECU 2 is connected to a laser radar 10 as an inter-vehicle distance detection device, and receives a detection signal from the laser radar 10. The laser radar 10 radiates a laser beam ahead of the host vehicle and receives the reflected light, to thereby detect the distance to the vehicle ahead, the relative speed, the amount of lateral deviation, and the like. The inter-vehicle distance detection device, which may be also referred to as an inter-vehicle distance detector, may be configured to acquire inter-vehicle distance information by using an in-vehicle camera instead of the laser radar 10 or by using radio waves such as millimeter waves or ultrasonic waves. Another configuration may be provided with a plurality of radars or a plurality of types of radars.

The engine ECU 3 performs engine control. The engine ECU 3 is connected to a vehicle speed sensor 11 that detects the speed of the host vehicle and an accelerator sensor 12 that acquires accelerator opening information, and receives detection signals from them. The brake ECU 4 is configured to be able to perform an automatic control of the brake. The brake ECU 4 is connected to a steering sensor 13 for detecting a steering angle of the steering and a yaw rate sensor 14 for detecting a rotational angular velocity acting on the host vehicle.

The alarming control ECU 6 controls the alarm device 16 that issues or gives an alarm (i.e., an alarm signal) to the user, that is, the driver. The alarm device 16, which is also referred to as an alarm, includes, for example, a buzzer, a synthesized speech output device, a display device, and the like. In this case, the alarming control ECU 6 receives (i) the inter-vehicle distance information with respect to the vehicle ahead from the inter-vehicle control ECU 2 and (ii) the vehicle speed information from the engine ECU 3. Furthermore, the alarming control ECU 6 receives manipulation information based on the manipulation switch 15 being manipulated, from the in-vehicle device ECU 5.

The alarming control ECU 6 determines the driving load including the inter-vehicle distance to the vehicle ahead while the host vehicle is traveling. If the determination result satisfies an alarming condition of enabling the alarm device 16, the alarm device 16 issues an alarm to the user, that is, the driver, when the user intends to manipulate the manipulation switch 15 of the in-vehicle device. Therefore, the alarming control ECU 6 includes a driving load determination unit and a part of the alarm device 16. It is noted that if the alarming condition is satisfied, even if the user manipulates the manipulation switch 15 of the in-vehicle device, the manipulation is not accepted and becomes disabled.

In the present embodiment, both values of the vehicle speed information and the inter-vehicle distance information are used for a method for determining the driving load. Specifically, as shown in FIG. 3, the value of the ratio of the inter-vehicle distance to the vehicle speed is obtained. If the value of the ratio is small (i.e., is less than a constant value or a threshold value), it is determined that the driving load is small and that it is in the safe region, and no alarm is issued. In contrast, if the value of the ratio is not less than a constant value or a threshold value, it is determined that the driving load is in an alarming region where an alarm needs to be issued, that is, the alarming condition is satisfied.

Thereby, it is determined that the alarming condition is satisfied when the inter-vehicle distance is relatively short and the vehicle speed is relatively large. If the vehicle speed is small even if the inter-vehicle distance is short, it is determined that the driving load is small (i.e., in a safe region). If the inter-vehicle distance is long even if the vehicle speed is large, it is determined that the driving load is small (i.e., in a safe region).

Then, the inter-vehicle control ECU 2 achieves a cruise control function that follows a preceding vehicle traveling ahead of the host vehicle while maintaining the set target inter-vehicle distance based on the cruise control switch 8 being turned on. In this case, the inter-vehicle distance information with respect to the preceding vehicle detected by the laser radar 10 is input to the inter-vehicle control ECU 2. Further, the inter-vehicle control ECU 2 receives vehicle speed information and accelerator information from the engine ECU 3, steering angle information and yaw rate information from the brake ECU 4, and the like. In addition, the inter-vehicle control ECU 2 also receives information on road the host vehicle is traveling and the like from the navigation device. The alarming control ECU 6 is also supplied with turn signal information indicating the state of the turn signal (not shown).

The inter-vehicle control ECU 2 outputs a control command signal to the engine ECU 3 and the brake ECU 4 so that the target inter-vehicle distance set by manipulating the inter-vehicle distance setting switch 9 is maintained based on the various input information described above. Thus, the accelerator and brake are automatically controlled, and cruise control is performed in which the host vehicle tracks the rear of the preceding vehicle with a predetermined inter-vehicle distance. Note that when the cruise control switch 8 is turned on in the absence of a preceding vehicle, the control of the accelerator or the brake is performed so that the host vehicle travels at a constant speed, for example.

The alarming control ECU 6 determines the driving load as described above while the host vehicle is running, and determines whether the determined driving load satisfies the alarming condition of enabling the alarm device 16. In this case, the alarming control ECU 6 receives information indicating whether or not the cruise control function is being executed from the inter-vehicle control ECU 2, and, also, accelerator manipulation information from the engine ECU 3. As will be described in detail in the following description of an operation, the alarming control ECU 6 excludes the execution state of the cruise control function from the alarming condition of enabling the alarm device 16. In other words, during execution of the cruise control function, even if the determination of the driving load becomes large enough to satisfy the alarming condition (i.e., even if the "inter-vehicle time" becomes less than a constant value or a threshold value), the alarm device 16 is disabled and thus any alarm is not issued by the alarm device 16.

It is noted that, in the present embodiment, during execution of the cruise control function, the alarming control ECU 6 determines an override state in which acceleration is manipulated forcedly by a driver's accelerator depression manipulation. When it is determined that the host vehicle is in the override state, the alarming control ECU 6 enables the above-described alarming process, that is, restores the one excluded from the alarming condition. Therefore, the alarming control ECU 6 also functions as a disabling unit, a determination unit, and an enabling unit. The override state includes deceleration forced by the driver's brake manipulation, but here, deceleration is omitted from the description.

Next, an operation of the vehicle control system 1 configured as described above will be described with reference to FIG. 2. The flowchart of FIG. 2 shows the sequence of a process related to alarming executed by the alarming control ECU 6 while the vehicle is traveling. Here, the vehicle speed information and the inter-vehicle distance information are input to the alarming control ECU 6; also, an ON/OFF signal for the cruise control function, an accelerator ON signal, and a signal indicating whether or not the manipulation switch 15 of the in-vehicle device is manipulated are input. The alarming control ECU 6 performs the following process based on the input information. This process is repeatedly executed at predetermined time intervals, for example.

That is, in step S1, the driving load is estimated. As described above, the driving load is estimated by obtaining a value of the ratio of the inter-vehicle distance to the vehicle speed from the vehicle speed information and the inter-vehicle distance information, and by determining whether or not the obtained value of the ratio is equal to or greater than a threshold value. In step S2, it is determined whether the driving load is equal to or greater than a threshold value. If the driving load is less than the threshold value (No in step S2), it is determined that the alarming condition is not satisfied, that is, in the safety region of FIG. 3, so that no alarm is issued.

Figure 3:
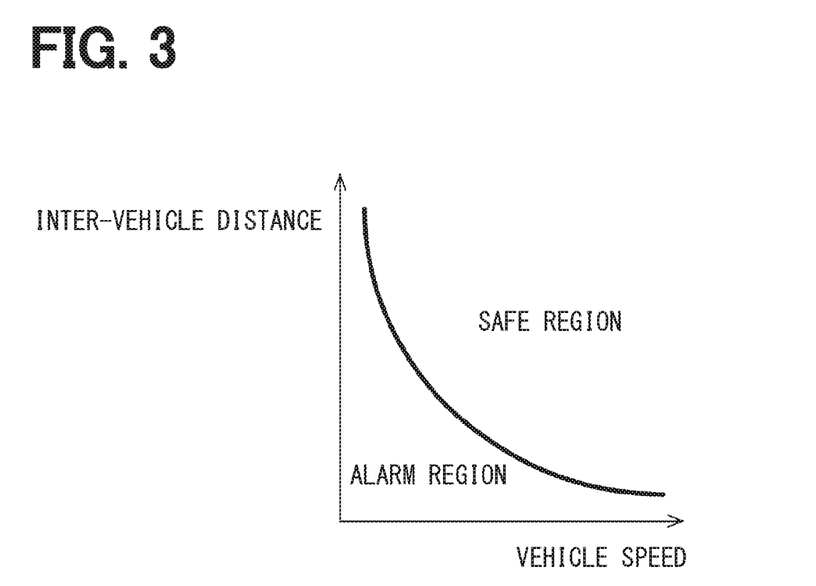
FIG. 3 is a diagram for explaining a method for determining a driving load.

On the other hand, when the driving load is equal to or greater than the threshold value (Yes in step S2), it is determined that the alarming condition is satisfied, that is, in the alarming region in FIG. 3, and the process proceeds to the next step S3. In step S3, it is determined whether or not the manipulation switch 15 of the in-vehicle device is manipulated. If the manipulation switch 15 is not manipulated (No in step S3), no alarm is issued. If the manipulation switch 15 is manipulated (Yes in step S3), the process proceeds to the next step S4. In step S4, it is determined whether or not the cruise control function is in the off state. If the cruise control function is in the off state (Yes in step S4), an alarm is issued.

On the other hand, when the cruise control function is in the on state (No in step S4), the process proceeds to step S5. In step S5, it is determined whether or not an override state is arising during execution of the cruise control function. The override state is a state in which the accelerator is forcedly turned on, that is, the acceleration manipulation is performed. If there is arising an override state where the accelerator is forcedly turned on (Yes in step S5), an alarm is also issued. When the accelerator is not forcedly turned on (No in step S5), no alarm is issued.

As described above, the alarming control ECU 6 always determines the driving load including the inter-vehicle distance to the vehicle ahead when the vehicle is traveling. If the determination result satisfies the alarming condition, the alarm device 16 issues an alarm to the user or the drier when the user intends to manipulate the manipulation switch 15 of the in-vehicle device on the condition that the cruise control function is not being executed. This ensures safety for the driver when driving with a relatively short distance to the vehicle ahead.

Here, when the above cruise control function is executed, that is, when the preceding vehicle is automatically tracked, the inter-vehicle distance may vary due to acceleration/deceleration of the preceding vehicle or the like. For this reason, the alarming condition may be temporarily satisfied, an unnecessary alarm is issued, and it is expected that the driver feels troublesome. However, in the present embodiment, during execution of the cruise control function, basically, even if the driving load is large, that is, the inter-vehicle distance between the host vehicle and the vehicle ahead is relatively short, the alarm to the manipulation applied to the in-vehicle device is not issued. As a result, the driver does not feel troublesome by unnecessary alarms during execution of the cruise control function.

Even during execution of the cruise control function, an override state may arise in which the driver depresses the accelerator to accelerate the host vehicle to be out of control of the cruise control function. However, in that case, if such an override state is excluded from the alarming condition of enabling the alarm device 16, there is arising an issue not to use effectively the useful alarming system even though the driver is driving independently from the cruise control. In the present embodiment, during execution of the cruise control function, an override state is determined in which acceleration or deceleration manipulation forcedly performed by the driver. When it is determined that the override state is arising, the alarming system is enabled.

Therefore, when (i) the alarming system for manipulation applied to the in-vehicle device and (ii) the cruise control system coexist, the present embodiment can appropriately perform the adjustment of the both, that is, the adjustment of how to control the alarming. As a result, according to the alarming system of the present embodiment, even in a vehicle having a cruise control function, it is possible to perform alarming control that can provide an effect to control alarming that achieves both comfort and safety of the driver.

(2) Second and Third Embodiments, Other Embodiments

Next, a second embodiment will be described with reference to FIGS. 4 to 6. Also in the second embodiment, the hardware configuration of the vehicle control system 1 mounted on the host vehicle is the same as that in the first embodiment. The second embodiment is different from the first embodiment in the following points. That is, in the second embodiment, when the cruise control function is executed, the user, that is, the driver, can manipulate the inter-vehicle distance setting switch 9 to freely set and change the target inter-vehicle distance. Then, the inter-vehicle control ECU 2 outputs a control command signal so as to maintain the set target inter-vehicle distance, thereby controlling the accelerator and the brake.

Then, as will be described in the following flowchart explanation, the alarming control ECU 6 determines whether or not the current state of the host vehicle is a state where the inter-vehicle distance is being adjusted during execution of the cruise control function. When it is determined that the current state of the host vehicle is a state where the inter-vehicle distance is being adjusted, the current state is excluded from the alarming condition of enabling the alarming process, in other words, the alarm device 16 is disabled in the current state of the host vehicle where the inter-vehicle distance is being adjusted. In other words, during execution of the cruise control function, even if the determination of the driving load increases to satisfy the alarming condition, the alarm is not issued when the inter-vehicle distance is being adjusted currently. Therefore, in this embodiment, the alarming control ECU 6 functions as a determination unit and a disabling unit. As will be described later, whether or not the inter-vehicle distance is being adjusted is determined based on whether the inter-vehicle distance adjusting flag is on or off.

Figure 4:
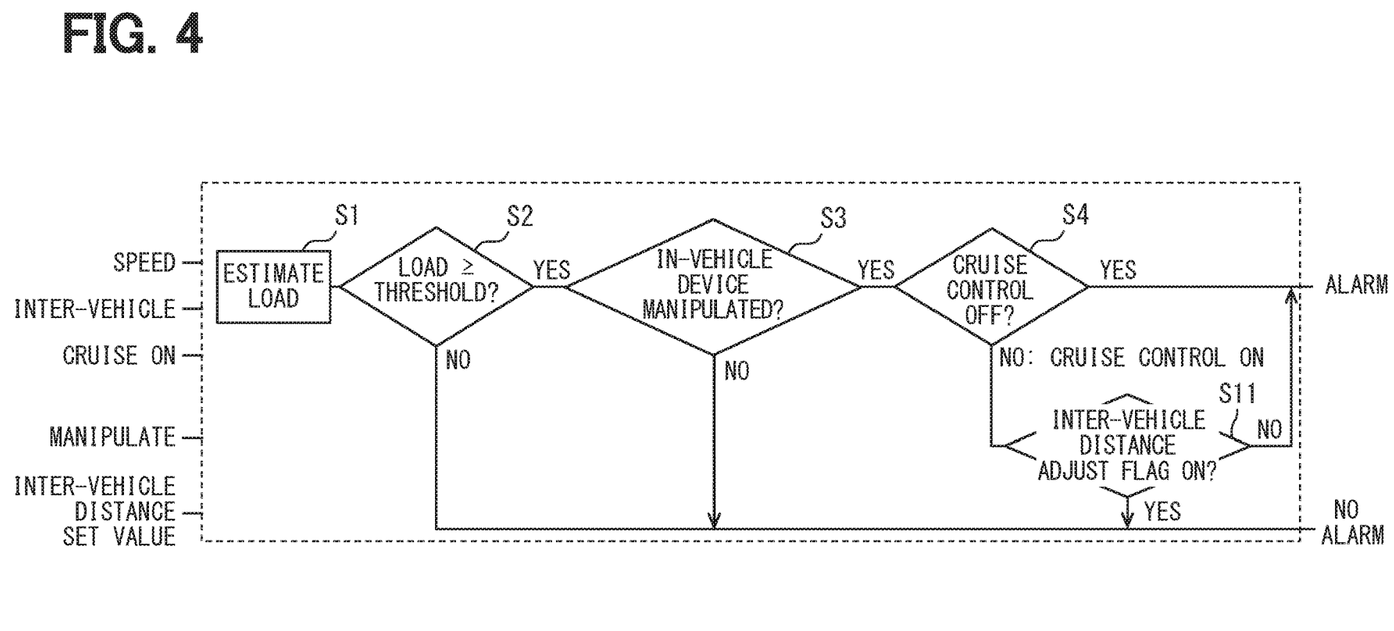
FIG. 4 is a flowchart schematically showing a procedure of a process related to alarming executed by an alarming control ECU during traveling of a vehicle, according to a second embodiment.

The flowchart of FIG. 4 shows a sequence of a process related to alarming executed by the alarming control ECU 6 while the vehicle is traveling in the second embodiment. Here, the vehicle speed information and the inter-vehicle distance information are input to the alarming control ECU

6. At the same time, the alarming control ECU 6 receives an ON/OFF signal for the cruise control function, a signal indicating whether or not the manipulation switch 15 of the in-vehicle device is manipulated, information on the current inter-vehicle distance, and information on the set value of the inter-vehicle distance.

The processing in steps S1 to S4 is the same as that in the first embodiment. In step S1, the driving load is estimated from the vehicle speed information and the inter-vehicle distance information. In step S2, it is determined whether the driving load is equal to or greater than a threshold value. When the driving load is less than the threshold value (No in step S2), it is determined that the alarming condition is not satisfied, that is, in the safe region, and no alarm is issued. On the other hand, when the driving load is equal to or greater than the threshold value (Yes in step S2), it is determined that the alarming condition is satisfied, and the process proceeds to step S3.

In step S3, it is determined whether or not the manipulation switch 15 of the in-vehicle device is manipulated. If the manipulation switch 15 is not manipulated (No in step S3), no alarm is issued. If the manipulation switch 15 is manipulated (Yes in step S3), it is determined in the next step S4 whether or not the cruise control function is in an off state. If the cruise control function is in the off state (Yes in step S4), an alarm is issued. On the other hand, when the cruise control function is in the on state (No in step S4), the process proceeds to step S11.

In step S11, it is determined whether the inter-vehicle distance is being adjusted by the cruise control function, that is, whether the inter-vehicle distance adjusting flag is on. If the inter-vehicle distance is not being adjusted, that is, if the inter-vehicle distance adjusting flag is off (No in step S11), an alarm is issued even during execution of the cruise control function. On the other hand, when the inter-vehicle distance is being adjusted, that is, when the inter-vehicle distance adjusting flag is on (Yes in step S11), the alarm device 16 is disabled and no alarm is issued.

Figure 5:
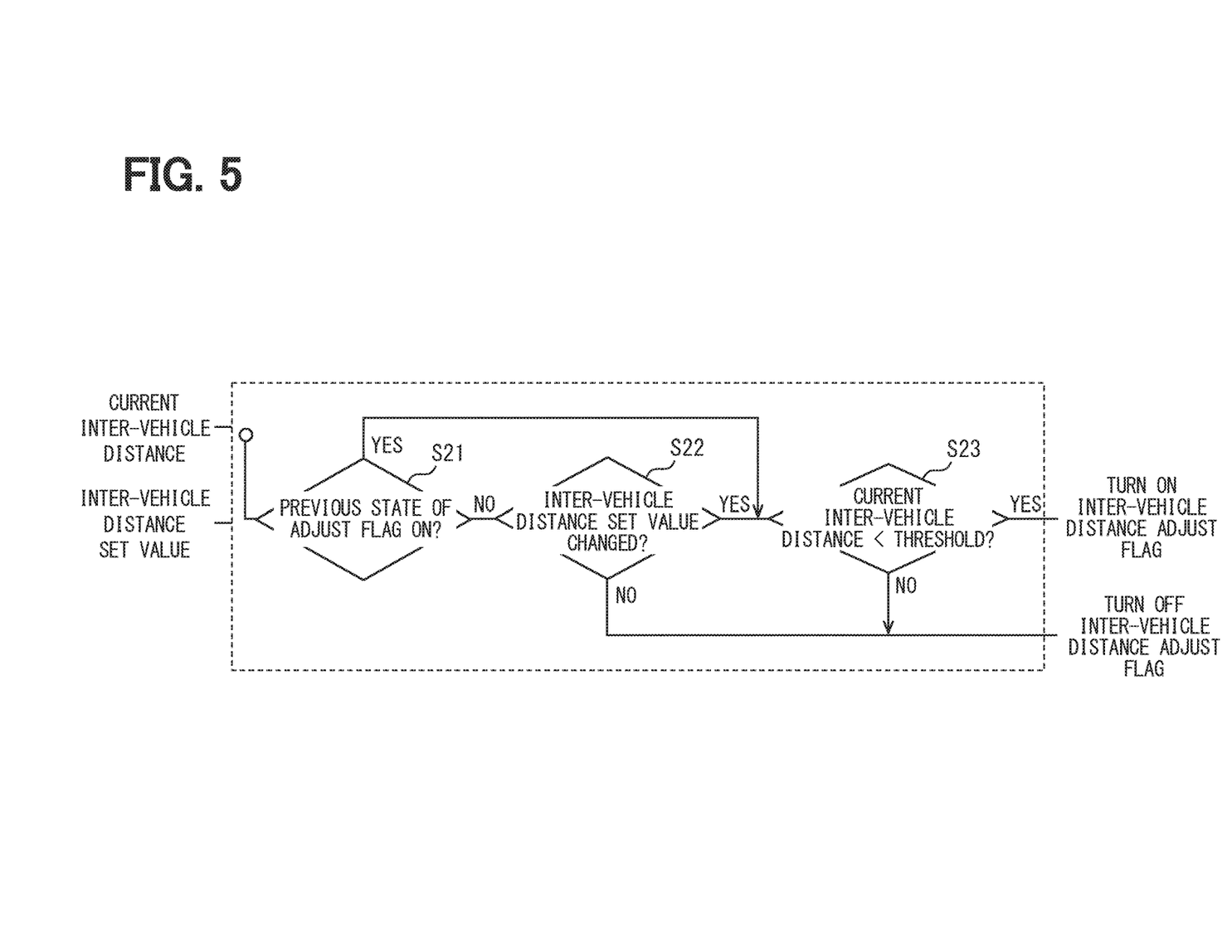
FIG. 5 is a flowchart showing a procedure of a process related to an inter-vehicle distance adjusting flag.

Here, FIG. 5 shows a procedure of the on/off processing of the inter-vehicle distance adjusting flag executed by the alarming control ECU 6. In this process, information on the current inter-vehicle distance and information on the set value of the inter-vehicle distance by the inter-vehicle distance setting switch 9 are used. First, in step S21, it is determined whether or not the previous state of the inter-vehicle distance adjusting flag is on. When the previous state of the inter-vehicle distance adjusting flag is on (Yes in step S21), the process proceeds to subsequent step S23.

If the previous state of the inter-vehicle distance adjusting flag is off (No in step S21), the process proceeds to step S22, and it is determined whether the inter-vehicle distance setting switch 9 is manipulated and the inter-vehicle distance set value is changed. If the inter-vehicle distance set value is not changed (No in step S22), the inter-vehicle distance adjusting flag remains off. On the other hand, when the inter-vehicle distance setting switch 9 is manipulated and the inter-vehicle distance set value is changed (Yes in step S22), the process proceeds to the next step S23.

In step S23, it is determined whether the current inter-vehicle distance to the preceding vehicle is less than a threshold value. Here, as described above, by manipulating the inter-vehicle distance setting switch 9, the target inter-vehicle distance, that is, the inter-vehicle distance to be maintained, is set in three stages: short, middle, and long. The above threshold value is set in advance for each of the short, middle, and long target inter-vehicle distances. When the current inter-vehicle distance is less than the threshold value, that is, short (Yes in step S23), the inter-vehicle distance adjusting flag is turned on. On the other hand, if the current inter-vehicle distance is equal to or greater than the threshold value (i.e., No in step S23), the inter-vehicle distance adjusting flag is turned off.

Figure 6:
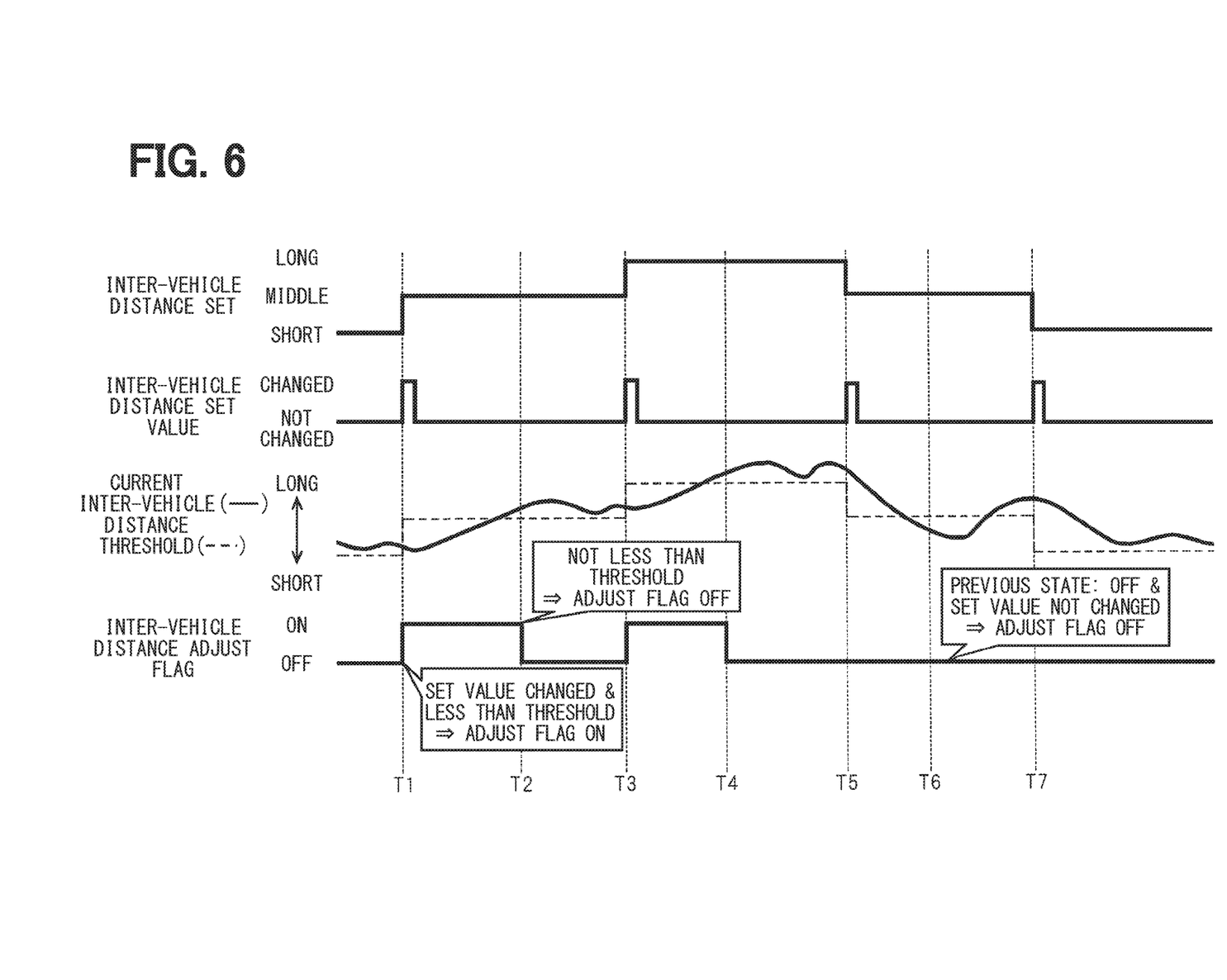
FIG. 6 is a time chart showing changes in an inter-vehicle distance and an inter-vehicle distance adjusting flag when the set value of the inter-vehicle distance is changed during traveling of a vehicle.

Further, FIG. 6 shows how the inter-vehicle distance and the inter-vehicle distance adjusting flag change through the processing by the alarming control ECU 6 as described above, when the set value of the inter-vehicle distance changes due to the inter-vehicle distance setting switch 9 manipulated by the user during execution of the cruise control function. Now, it is assumed that the set value of the target inter-vehicle distance is changed from "short" to "middle" by the inter-vehicle distance setting switch 9 at time T1. In this case, since the set value of the inter-vehicle distance changes and the actual inter-vehicle distance is less than the "middle" target inter-vehicle distance, that is, the threshold value, the inter-vehicle distance adjusting flag is switched from off to on. By adjusting the inter-vehicle distance, at time T2, the actual inter-vehicle distance is not less than the "middle" threshold value, so the inter-vehicle distance adjusting flag is switched to off.

Furthermore, if the set value of the target inter-vehicle distance is changed from "middle" to "long" at time T3, the actual inter-vehicle distance is less than the threshold value corresponding to "long". The inter-vehicle distance adjusting flag is switched to on. At time T4 when the inter-vehicle distance is adjusted to be equal to or greater than the threshold value, the inter-vehicle distance adjusting flag is switched to off. Even if the set value of the target inter-vehicle distance is changed from "long" to "middle" at time T5, the inter-vehicle distance adjusting flag remains off because the inter-vehicle distance is not less than the "intermediate" threshold value. At time T6, the actual inter-vehicle distance is temporarily less than the threshold value, but at this time, since the set value of the target inter-vehicle distance is not changed, the inter-vehicle distance adjusting flag remains off.

According to the second embodiment as described above, the alarming control ECU 6 always determines the driving load including the inter-vehicle distance to the vehicle ahead while the vehicle is traveling. If the determination result satisfies the alarming condition, the alarm device 16 issues an alarm to the user, that is, the driver, on the condition that the cruise control function is not being executed when the user intends to manipulate the manipulation switch 15 of the in-vehicle device. This ensures safety for the driver when driving with a relatively short distance to the vehicle ahead.

When the cruise control function is executed, the set inter-vehicle distance is automatically adjusted based on the manipulation of the inter-vehicle distance setting switch 9. During the adjustment of the inter-vehicle distance, the driver can safely manipulate the in-vehicle device, but the inter-vehicle distance to the preceding vehicle may be temporarily shorter than the threshold value for the alarming. However, during the adjustment of the inter-vehicle distance, the alarm device 16 is disabled and no alarm is issued. It is thus possible to prevent the user from feeling troublesome during the adjustment of the inter-vehicle distance.

Figure 7:
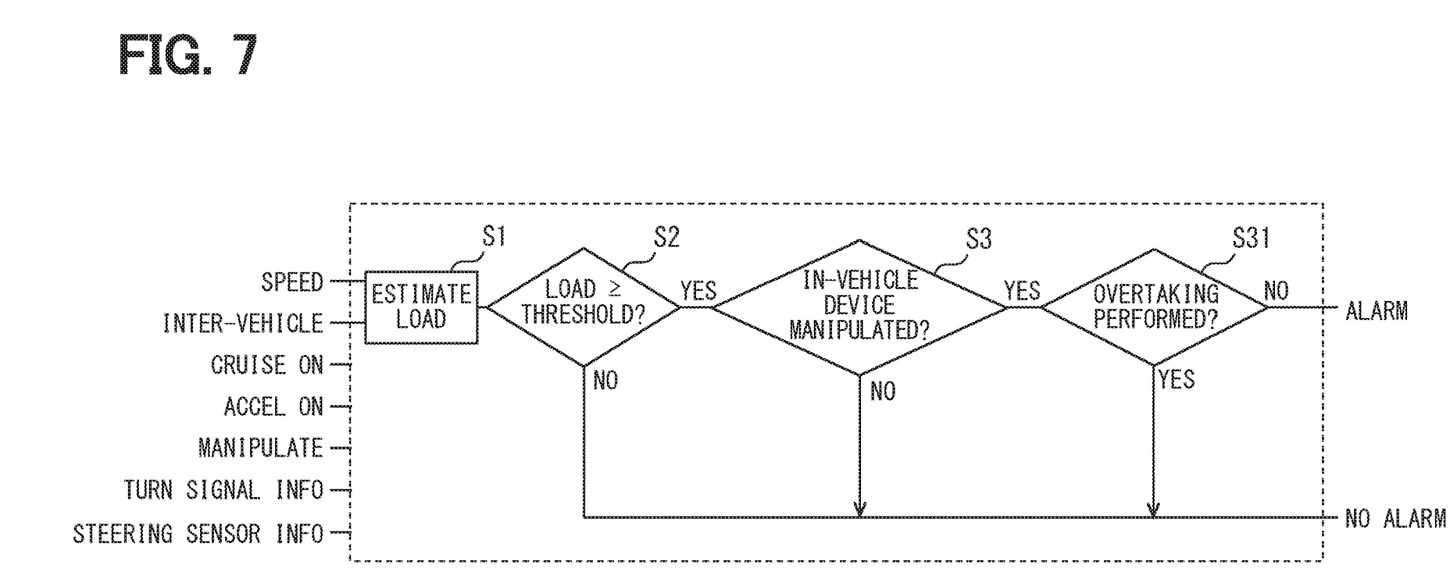
FIG. 7 is a flowchart schematically showing a procedure of a process related to alarming executed by an alarming control ECU during traveling of a vehicle, according to a third embodiment.

FIG. 7 shows a third embodiment. Also in the third embodiment, the hardware configuration of the vehicle control system 1 mounted on the vehicle is the same as that in the first embodiment shown in FIG. 1. The third embodiment differs from the first and second embodiments in the following points. That is, the alarming control ECU 6 determines whether or not the current state is where the host vehicle is performing an overtaking operation to overtake the preceding vehicle during traveling. When it is determined that the current state is where the overtaking operation is being performed, the current state is excluded from the alarming condition for performing the alarming process. In other words, the alarm device 16 is disabled.

Therefore, in the third embodiment, the alarming control ECU 6 has functions as an overtaking determination unit and a disabling unit. The method of determining whether the above-mentioned host vehicle is performing an overtaking operation can adopt the method of determining whether the manipulation of the right turn signal, the acceleration by turning on the accelerator, and the movement to the right (i.e., the lane change) are performed in sequence. It is also possible to determine an overtaking operation using a camera image or the like. In the third embodiment, a process related to alarming is performed regardless of whether the cruise control function is on or off.

The flowchart of FIG. 7 shows a sequence of a process related to alarming executed by the alarming control ECU 6 while the vehicle is traveling in the third embodiment. Here, vehicle speed information and inter-vehicle distance information are input to the alarming control ECU 6. At the same time, the alarming control ECU 6 receives a cruise control function on/off signal, an accelerator on signal, a signal indicating whether or not the manipulation switch 15 of the in-vehicle device is manipulated, turn signal information, and steering sensor information.

The processing in steps S1 to S3 are the same as those in the first and second embodiments. In step S1, the driving load is estimated from the vehicle speed information and the inter-vehicle distance information. In step S2, the driving load is calculated. It is determined whether or not the driving load is equal to or greater than the threshold value. When the driving load is less than the threshold value (No in step S2), it is determined that the alarming condition is not satisfied, that is, in the safe region, and no alarm is issued. On the other hand, when the driving load is equal to or greater than the threshold value (Yes in step S2), it is determined that the alarming condition is satisfied, and the process proceeds to step S3.

In step S3, it is determined whether or not the manipulation switch 15 of the in-vehicle device is manipulated. If the manipulation switch 15 is not manipulated (No in step S3), no alarm is issued. If the manipulation switch 15 is manipulated (Yes in Step S3), it is determined in the next Step S31 whether or not the host vehicle is performing an overtaking operation. If it is determined that the overtaking operation is not being performed (No in step S31), an alarm is issued. On the other hand, when it is determined that the overtaking operation is being performed (Yes in step S31), the alarm device 16 is disabled and no alarm is issued.

According to the third embodiment, the alarming control ECU 6 constantly determines the driving load including the inter-vehicle distance to the vehicle ahead while the host vehicle is traveling. When the determination result satisfies the alarming condition, the alarm device 16 issues an alarm to the user, that is, the driver when the user intends to manipulate the manipulation switch 15 of the in-vehicle device. This ensures safety for the driver when driving with a relatively short inter-vehicle distance to the vehicle ahead. When an overtaking operation is being performed, the host vehicle may be sufficiently close to the vehicle ahead of the host vehicle. In this case, an unnecessary alarm may be troublesome to the user. In the present embodiment, no alarm is issued during the overtaking operation, so that the user can be prevented from feeling troublesome.

Each of the above embodiments provides a configuration in which the alarm device 16 issues an alarm when the user intends to manipulate the manipulation switch 15 of the in-vehicle device. On the other hand, another configuration may be provided in which when the driving load satisfies the alarming condition, the user is notified that the user cannot manipulate the in-vehicle device regardless of whether or not the user intends to manipulate the in-vehicle device. Moreover, in the present disclosure, it is also possible to implement combining several above-mentioned embodiments. In addition, various changes can be made with respect to the setting method of the target inter-vehicle distance or the overall hardware configuration of the vehicle control system.

Although the present disclosure has been described in accordance with the embodiments, it may be understood that the present disclosure is not limited to such embodiments or configurations. The present disclosure encompasses various modification examples and variations within the scope of equivalents. In addition, various combinations and forms, and further, other combinations and forms including only one element, or more or less than these elements are also within the scope of the present disclosure.

For reference to further explain features of the present disclosure, the description is added as follows.

In recent years, in vehicles such as automobiles, the types of in-vehicle devices such as navigation devices, air conditioners, audio devices, and various steering switches have been increased and the functions of the in-vehicle devices have been diversified. In contrast, in order to ensure the safety of driving by the driver, while the host vehicle is running, there are restrictions on the functions of display and/or manipulation on the in-vehicle devices; also, an alarming system is provided to issue an alarm when a driver intends to manipulate the in-vehicle device. In such an alarming system, when the inter-vehicle distance to a vehicle ahead of the host vehicle acquired with the camera or radar falls below a threshold value, it is determined that the safety level is low. Thereby, an alarm is issued when the driver intends to manipulate the in-vehicle device.

Vehicles such as automobiles are commonly provided with a cruise control system which controls the speed of the host vehicle automatically. Such a cruise control function is configured to automatically control the speed and/or break of the host vehicle to track a specified preceding vehicle running the road ahead of the host vehicle so as to keep the inter-vehicle distance to the preceding vehicle constant. Further, when there is no preceding vehicle, the traveling speed of the host vehicle is kept constant.

Here, when the cruise control function described above is executed, that is, when the preceding vehicle is automatically tracked, the inter-vehicle distance may vary due to acceleration/deceleration of the preceding vehicle. In such cases, the inter-vehicle distance may temporarily fall below the above threshold value. In this case, the inter-vehicle distance may be quickly adjusted to return to the inter-vehicle distance above the threshold value; however, if the alarming system is operated as it is, an unnecessary alarm may be issued to make the driver feel troublesome. It can be therefore considered that the execution state of the cruise control function be excluded from the alarming condition of enabling the alarming system.

In contrast, during the execution state of the cruise control function, it is also possible for the driver to depress the accelerator and accelerate, that is, to enter an override state that is out of control of the cruise control function. In such a case, if the execution state of the cruise control function is excluded from the alarming condition of enabling the alarming system, there is arising an issue not to use effectively the alarming system even though the driver is driving independently from the cruise control. It is conventionally not considered the cases where both of the alarming system for in-vehicle device manipulation and the cruise control system coexist. That is, it has not been considered how to adjust the both or how to control the alarming when the both coexist.

It is thus desired to provide a vehicle alarming system capable of controlling the alarming that can achieve both comfort and safety of a driver even in a vehicle having a cruise control function.

Aspects of the present disclosure described herein are set forth in the following clauses.

According to a first aspect of the present disclosure, a vehicle alarming system is provided to include (i) an inter-vehicle distance detector, (ii) a driving load determination unit, and (iii) an alarm. The inter-vehicle distance detector is configured to detect an inter-vehicle distance between the host vehicle and a vehicle ahead of the host vehicle. The driving load determination unit is configured to perform a driving load determination as to a driving load including the inter-vehicle distance detected by the inter-vehicle distance detector. The alarm is configured to issue an alarm signal to a manipulation applied to an in-vehicle device in response to that a result of the driving load determination performed by the driving load determination unit satisfies an alarming condition of enabling the alarm. The host vehicle has a cruise control function that follows a preceding vehicle while maintaining a predetermined inter-vehicle distance between the preceding vehicle and the host vehicle. The vehicle alarming system further includes a disabling unit, a determination unit, and an enabling unit. The disabling unit is configured to exclude an execution state of the cruise control function from the alarming condition of enabling the alarm. The determination unit is configured to determine an override state in which acceleration or deceleration is manipulated forcedly by a driver of the host vehicle under the execution of the cruise control function. The enabling unit is configured to enable the alarm in response to that the determination unit determines the override state.

In the above, the driving load determination unit, the disabling unit, the determination unit, and the enabling unit may be provided individually to be implemented by an electronic control circuit.

According to the above configuration, when the cruise control function is not executed, the inter-vehicle distance detector detects the inter-vehicle distance to the vehicle ahead, and the driving load determination unit determines the driving load including the inter-vehicle distance. When the determination result satisfies the alarming condition, an alarm signal is issued by the alarm to the manipulation applied to the in-vehicle device. Thereby, for example, when the inter-vehicle distance to the vehicle ahead is shorter than a threshold value, an alarm signal is issued for the manipulation applied to the in-vehicle device.

On the other hand, during execution of the cruise control function, basically, the disabling unit excludes the execution state of the cruise control function from the alarming condition of enabling the alarm, and no alarm signal is issued for the manipulation applied to the in-vehicle device. As a result, the driver does not feel troublesome by unnecessary alarm signals during execution of the cruise control function. Further, during execution of the cruise control function, the determination unit may determine the override state in which the driver has manipulated forced acceleration or deceleration. When it is determined that the override state is arising, the alarm is enabled by the enabling unit.

Therefore, when the driver goes out of control of the cruise control function by accelerating the host vehicle, the alarming system is effectively used. As a result, according to the present disclosure, even in a vehicle having a cruise control function, an excellent effect is provided to perform alarming control that can achieve both comfort and safety for the driver.

According to a second aspect of the present disclosure, a vehicle alarming system is provided to include (i) an inter-vehicle distance detector, (ii) a driving load determination unit, and (iii) an alarm. The inter-vehicle distance detector is configured to detect an inter-vehicle distance between the host vehicle and a vehicle ahead of the host vehicle. The driving load determination unit is configured to perform a driving load determination as to a driving load including the inter-vehicle distance detected by the inter-vehicle distance detector. The alarm is configured to issue an alarm signal to a manipulation applied to an in-vehicle device in response to that a result of the driving load determination performed by the driving load determination unit satisfies an alarming condition of enabling the alarm. The host vehicle has a cruise control function that follows a preceding vehicle while maintaining a predetermined inter-vehicle distance between the preceding vehicle and the host vehicle. The vehicle alarming system further includes a determination unit and a determination unit. The determination unit is configured to determine under an execution of the cruise control function whether an inter-vehicle distance is being adjusted based on (i) a change in an inter-vehicle distance set value, (ii) a current inter-vehicle distance, and (iii) the inter-vehicle distance set value. The disabling unit is configured to disable the alarm in response to that the determination unit determines that the inter-vehicle distance is being adjusted.

In the above, the driving load determination unit, the determination unit, and disabling unit may be provided individually to be implemented by an electronic control circuit.

According to a third aspect of the present disclosure, a vehicle alarming system is provided to include (i) an inter-vehicle distance detector, (ii) a driving load determination unit, and (iii) an alarm. The inter-vehicle distance detector is configured to detect an inter-vehicle distance between the host vehicle and a vehicle ahead of the host vehicle. The driving load determination unit is configured to perform a driving load determination as to a driving load including the inter-vehicle distance detected by the inter-vehicle distance detector. The alarm is configured to issue an alarm signal to a manipulation applied to an in-vehicle device in response to that a result of the driving load determination performed by the driving load determination unit satisfies an alarming condition of enabling the alarm. The vehicle alarming system further includes an overtaking determination unit and a disabling unit. The overtaking determination unit is configured to determine that an overtaking operation of overtaking a preceding vehicle is being performed by the host vehicle. The disabling unit is configured to disable the alarm in response to that the overtaking determination unit determines that the overtaking operation is being performed.

In the above, the driving load determination unit, the overtaking determination unit, and disabling unit may be provided individually to be implemented by an electronic control circuit.

What is claimed is:

1. A vehicle alarming system mounted to a host vehicle and including (i) an inter-vehicle distance detector configured to detect an inter-vehicle distance between the host vehicle and a vehicle ahead of the host vehicle, and (ii) an alarm configured to issue an alarm signal to a manipulation applied to an in-vehicle device in response to that a driving load including the inter-vehicle distance detected by the inter-vehicle distance detector satisfies an alarming condition of enabling the alarm, the vehicle having a cruise control function that follows a preceding vehicle while maintaining a predetermined inter-vehicle distance between the preceding vehicle and the host vehicle, the vehicle alarming system comprising:
a disabling unit configured to exclude an execution state of the cruise control function from the alarming condition of enabling the alarm;
a determination unit configured to determine an override state in which acceleration or deceleration is forcedly manipulated by a driver of the host vehicle under the execution of the cruise control function; and
an enabling unit configured to enable the alarm in response to determining the override state.

2. The vehicle alarming system according to claim 1, further comprising:
an electronic control circuit configured to implement the disabling unit, the determination unit, and the enabling unit.

3. The vehicle alarming system according to claim 1, wherein:
the in-vehicle device to which the manipulation is applied includes a navigation device, an air conditioner device, or an audio device, the manipulation against which the alarm signal is issued by the alarm.

4. The vehicle alarming system according to claim 1, wherein:
in cases that under the execution of the cruise control function,
(i) the driving load satisfies the alarming condition of enabling the alarm, and
(ii) the override state in which the acceleration or the deceleration is forcedly manipulated by the driver is not determined,
even when the manipulation is applied to the in-vehicle device, the alarm is prevented from issuing the alarm signal against the manipulation applied to the in-vehicle device.

5. The vehicle alarming system according to claim 3, wherein:
the in-vehicle device to which the manipulation is applied includes a navigation device, an air conditioner device, or an audio device, the manipulation against which the alarm signal is issued by the alarm.

6. The vehicle alarming system according to claim 3, wherein:
the in-vehicle device to which the manipulation is applied includes a device precluding an accelerator, a brake, and a steering wheel, the manipulation against which the alarm signal is issued by the alarm.

7. The vehicle alarming system according to claim 3, wherein:
a ratio of the inter-vehicle distance to a vehicle speed is less than a threshold value, the driving load is determined to satisfy the alarming condition of enabling the alarm.

8. The vehicle alarming system according to claim 3, wherein:
when the alarming condition is satisfied, the manipulation applied to the in-vehicle device is not accepted and becomes disabled.

9. The vehicle alarming system according to claim 1, further comprising:
a driving load determination unit configured to determine the driving load based on the inter-vehicle distance detected by the inter-vehicle distance detector by determining a ratio of the inter-vehicle distance to a vehicle speed of the host vehicle;
wherein the alarm is further configured to compare the ratio with a threshold value, determine that the driving load satisfies the alarming condition when the ratio is greater than the threshold value, and determine that the driving load does not satisfy the alarming condition when the ratio is less than the threshold value.

10. The vehicle alarming system according to claim 1, wherein:
the alarm includes at least one of a buzzer, a synthesized speech output device, and a display device that generate output in response to the alarm signal when the alarm is enabled.

11. A vehicle alarming system mounted to a host vehicle and including (i) an inter-vehicle distance detector configured to detect an inter-vehicle distance to the host vehicle and a vehicle ahead of the host vehicle, and (ii) an alarm configured to issue an alarm signal to a manipulation applied to an in-vehicle device in response to that a driving load including the inter-vehicle distance detected by the inter-vehicle distance detector satisfies an alarming condition of enabling the alarm, the vehicle having a cruise control function that follows a preceding vehicle while maintaining a predetermined inter-vehicle distance between the preceding vehicle and the host vehicle, the vehicle alarming system comprising:
a determination unit configured to determine under an execution of the cruise control function whether an inter-vehicle distance is being adjusted based on (i) a change in an inter-vehicle distance set value, (ii) a current inter-vehicle distance, and (iii) the inter-vehicle distance set value; and
a disabling unit configured to disable the alarm in response to determining that the inter-vehicle distance is being adjusted.

12. The vehicle alarming system according to claim 11, further comprising:
an electronic control circuit configured to implement the determination unit and the disabling unit.

13. The vehicle alarming system according to claim 11, wherein:
in cases that under the execution of the cruise control function,
(i) the driving load satisfies the alarming condition of enabling the alarm, and
(ii) the inter-vehicle distance is determined to be under being adjusted,
even when the manipulation is applied to the in-vehicle device, the alarm is prevented from issuing the alarm signal against the manipulation applied to the in-vehicle device.

14. The vehicle alarming system according to claim 11, further comprising:
a driving load determination unit configured to determine the driving load based on the inter-vehicle distance detected by the inter-vehicle distance detector by determining a ratio of the inter-vehicle distance to a vehicle speed of the host vehicle;

wherein the alarm is further configured to compare the ratio with a threshold value, determine that the driving load satisfies the alarming condition when the ratio is greater than the threshold value, and determine that the driving load does not satisfy the alarming condition when the ratio is less than the threshold value.

15. The vehicle alarming system according to claim 11, wherein:
the alarm includes at least one of a buzzer, a synthesized speech output device, and a display device that generate output in response to the alarm signal when the alarm is enabled.

16. A vehicle alarming system mounted to a host vehicle and including (i) an inter-vehicle distance detector configured to detect an inter-vehicle distance between the host vehicle and a vehicle ahead of the host vehicle, and (ii) an alarm configured to issue an alarm signal to a manipulation of an in-vehicle device in response to that a driving load including the inter-vehicle distance detected by the inter-vehicle distance detector satisfies an alarming condition of enabling the alarm,
the vehicle alarming system comprising:
an overtaking determination unit configured to determine that an overtaking operation of overtaking a preceding vehicle is being performed by the host vehicle; and
a disabling unit configured to disable the alarm in response to determining that the overtaking operation is being performed.

17. The vehicle alarming system according to claim 16, further comprising:
an electronic control circuit configured to implement the overtaking determination unit and the disabling unit.

18. The vehicle alarming system according to claim 16, wherein:
in cases that
(i) the driving load satisfies the alarming condition of enabling the alarm, and
(ii) the overtaking operation of overtaking the preceding vehicle is determined under being performed by the host vehicle,
even when the manipulation is applied to the in-vehicle device, the alarm is prevented from issuing the alarm signal against the manipulation applied to the in-vehicle device.

19. The vehicle alarming system according to claim 16, further comprising:
a driving load determination unit configured to determine the driving load based on the inter-vehicle distance detected by the inter-vehicle distance detector by determining a ratio of the inter-vehicle distance to a vehicle speed of the host vehicle;
wherein the alarm is further configured to compare the ratio with a threshold value, determine that the driving load satisfies the alarming condition when the ratio is greater than the threshold value, and determine that the driving load does not satisfy the alarming condition when the ratio is less than the threshold value.

20. The vehicle alarming system according to claim 16, wherein:
the alarm includes at least one of a buzzer, a synthesized speech output device, and a display device that generate output in response to the alarm signal when the alarm is enabled.

* * * * *